Patented Nov. 4, 1941

2,261,700

UNITED STATES PATENT OFFICE 2,261,700

CLEANING COMPOSITION

John W. Ryznar, La Grange, Ill., assignor to National Aluminate Corporation, Chicago, Ill., a corporation of Delaware No Drawing. Application April 3, 1939, Serial No. 265,763

4 Claims. (Cl. 252—143)

This invention relates to a cleaning composition useful for the loosening and removal of iron oxide scale, dirt, oil, grease, etc. from metallic surfaces.

While the composition is primarily intended for the cleaning out of the cooling systems of internal combustion motors, its use is not at all limited thereto, as it can with equal facility be employed for the cleaning of metals, ferrous as well as non-ferrous. The composition may be furnished to the user in completely compounded form, either dry or in solution, or partly dry and partly in liquid form, or the ingredients may be packaged and sold to the user with directions for its compounding and utilization.

The primary active ingredients in the composition are oxalic acid, an emulsifying or wetting-out agent that will lower the surface tension of water, and an organic solvent of the non-water-miscible type, which latter functions as a solvent or remover of greasy materials, oils and the like. The wetting-out agent also enables the oxalic acid to obtain better access to accumulated scale and dirt by reason of the lowered surface tension of the mixture, whereby better and more rapid penetration of the scale or dirt, or both, is attained. The addition of another salt having an acid reaction, such as sodium hydrogen sulfate (NaHSO$_4$) or similar material, is optional.

The inside metallic surfaces of closed water systems, and particularly automobile radiators, have a tendency to collect a scale of iron oxide. This scale has a tendency to clog the system and to decrease the heat exchange value of the surface, whereby the efficiency of the radiator or heat exchange system may be greatly reduced. In addition to iron oxide, carbonates and films of oils and greases may also form on the walls of the system. In order to maintain the efficiency of this type of heat exchange system, it is desirable to periodically remove the scale and other deposits with various types of cleaning compounds. Iron oxide scale is quite difficult to remove by means of the prior art washing or scale-removing compounds, and no satisfactory cleansing agent has been described which accomplishes this result without injury to the pipes, valves, and connections in the water system which is being cleaned.

A further object of this invention is to provide a composition and means whereby the iron oxide scale may be readily dissolved and removed from water heat exchange systems such as radiators, boilers, and the like.

A further object of this invention is to provide a composition for removing iron oxide scale and other deposits from the interior surfaces of radiators and heat exchange systems without injury to the system itself. The use of the composition for the removal of iron rust and scale from metallic surfaces in other environments than heat exchange apparatus will be obvious.

Further and additional objects will apear from the following description and the appended claims.

It has been found that a solution of oxalic acid will readily remove the iron oxide scale which is deposited on metal surfaces such as exist in radiators and other water systems. The oxalic acid solution need only be passed through the system or over the metallic surface, or the metallic objects immersed therein, and the scale is thereby readily attacked and can then pass out of the system with the solution or be rinsed from the surface. This treatment may be carried out periodically and as often as desired without harmfully affecting the pipes, hose connections, pumps or valves which are associated with the system through which the cleaning compound is passed. Concentrations of oxalic acid which may be employed in the circulating system or treating fluid may vary within wide limits from fractions of 1% up to a saturated solution, i. e., about 10% or 15%, depending upon the temperature.

If desired, a cleaning composition may be prepared which will attack and remove oil and grease films from the surfaces to be cleaned at the same time that the oxalic acid is removing the iron oxide. This may be accomplished by incorporating an oil-solvent with the oxalic acid cleaning solution. In accordance with one embodiment of this invention, such a solvent may be kerosene or other hydrocarbon. An emulsifying or surface-tension-lowering agent may be added to the mixture in order that the water-insoluble solvent may be dispersed throughout the cleaning composition in the form of an emulsion. An example of one such composition prepared in accordance with the present invention is as follows:

| | | |
|---|---|---|
| Oxalic acid | grams | 400 |
| Sodium acid sulfate | do | 50 |
| Sodium lauryl sulfate or equivalent acid-compatible emulsifying agent | do | 20 |
| Kerosene or other hydrocarbon | quarts | 2 |
| Water | gallons | 5 |

The solid constituents of the above formula and the hydrocarbon may be added directly to the water.

The oxalic acid functions in the solution to loosen and dissolve the iron oxide while the hydrocarbon functions to dissolve any oil or grease films which may be deposited on the metallic surfaces being cleaned. It is possible to employ other solvents for the oils than kerosene. For example, other types of hydrocarbon solvents such as gasoline and the like may be employed. Hydrocarbon compounds such as their halogen substitution products may be employed (carbon tetrachloride, trichloroethylene, etc.). Also, under certain conditions, water-soluble oil-solvents may be used. In case a water-insoluble solvent is employed, such as a hydrocarbon, it is desirable to use an emulsifying agent, as indicated above, in order that the hydrocarbon may be completely dispersed throughout the cleaning composition and come into contact with all surfaces of the radiator or other article being cleaned. The sodium lauryl sulfate is exemplificative of a large group of emulsifying agents of a similar type, any of which that are compatible with an acid solution being capable of substitution for the sodium lauryl sulfate. For example, an acid-compatible emulsifying agent from the list beginning on page 66 of the January, 1939 issue of Industrial and Engineering Chemistry may be employed in place of the specific one described in the formula.

The compound or cleaning composition prepared, for example, in accordance with the above formula may be introduced directly into a radiator or other cooling system. The oxalic acid contained therein acts on the iron oxide scale, whereby it is removed from the surface of the metal. The hydrocarbon in the emulsion solubilizes the grease and oil films. The cleaning solution may then be withdrawn from the system, leaving the interior walls thereof substantially free of iron oxide deposits and oil or grease films. If desired, the oxalic acid solution may be employed without the addition of other reagents which remove other materials besides the iron rust or scale. Conversely, a great variety of other substances may be employed with the oxalic acid solution in order to effect the removal of other substances such as oil and grease, carbonate deposits, and the like from the interior surfaces of the enclosed water system. For example, a dry mixture may be prepared containing 400 grams of oxalic acid, 50 grams of sodium hydrogen (acid) sulfate and 20 grams of surface-tension-reducing agent such as sodium lauryl sulfate or its equivalent acid-compatible material, with instructions to the user to dissolve this amount of material in 5 gallons of water, or twice that amount of material in 10 gallons of water if 10 gallons of cleaning solution are to be prepared. The solution thus obtained may then be employed for immersing the articles to be cleaned therein, or may be poured or pumped into the heat-exchange system that it is desired to clean, as for instance the cooling system of an internal combustion motor. The user might also be instructed to add 2 quarts of a suitable hydrocarbon to each 5 gallons of the solution, stirring the latter to effect the proper emulsification of the added hydrocarbon to form an emulsion of the oil-in-water type. Such hydrocarbon may be an inexpensive one such as kerosene, or a lighter or a heavier hydrocarbon, or a hydrocarbon derivative such as tricholoroethylene, chloroform, carbon tetrachloride and the like. Where the surfaces to be cleaned are not very heavily burdened with oil or grease, the surface-tension-reducing agent alone may prove sufficient for the removal, by emulsification, of the oil and grease; but where the burden is heavy, the additional hydrocarbon will prove effective.

In some cases the additional acid-reacting salt may be omitted, as the oxalic acid alone is quite effective. Where there is no grease or oil, the surface-tension-reducing agent may likewise be omitted, although its presence will do no harm.

It is also within the contemplation of the inventor to furnish the user with a completely compounded liquid composition, ready for immediate use, or a more concentrated liquid composition that must be diluted by the ultimate user to the required, or desired, degree of concentration. As a further alternative, a package may be sold containing a mixture of such of the ingredients as can be mixed dry, together with a container of the liquid ingredients such as the hydrocarbon or hydrocarbon substitution product.

The essential material in the composition is the oxalic acid. It is the understanding of the inventor that the utility of oxalic acid as a scale-removing substance has never before been recognized, and therefore he is claiming the employment of this acid substance in accordance with the tenor of the hereunto appended claims.

While a particular embodiment of this invention is shown above, it will be understood, of course, that the invention is not to be limited thereto, since many modifications may be made; and it is contemplated, therefore, to cover any such modifications as fall within the true spirit and scope of this invention as defined by the appended claims.

I claim:

1. A composition of matter adapted to wash out radiators whereby scale and oil films are removed from the metallic surfaces thereof, comprising oxalic acid, water, kerosene, sodium lauryl sulfate, and sodium acid sulfate.

2. A radiator cleaning composition comprising approximately 400 grams of oxalic acid, 20 grams of sodium lauryl sulfate, 50 grams of sodium acid sulfate, 2 quarts of kerosene, and 5 gallons of water.

3. A process for cleaning a radiator which comprises passing through said radiator a liquid comprising approximately 400 grams of oxalic acid, 20 grams of sodium lauryl sulfate, 50 grams of sodium acid sulfate, 2 quarts of kerosene, and 5 gallons of water.

4. A composition of matter in the form of an emulsion and adapted to wash out radiators whereby scale and oil films are removed from the metallic surfaces thereof, comprising oxalic acid, water, a hydrocarbon grease solvent, sodium acid sulfate and a fatty alcohol sulfate as the emulsifying agent.

JOHN W. RYZNAR.